UNITED STATES PATENT OFFICE.

JOHN G. NEUMANN, OF INDIANAPOLIS, INDIANA.

METHOD OF PREPARING DESICCATED POTATOES.

SPECIFICATION forming part of Letters Patent No. 611,017, dated September 20, 1898.

Application filed April 18, 1898. Serial No. 678,058. (No specimens.)

*To all whom it may concern:*

Be it known that I, JOHN G. NEUMANN, of Indianapolis, county of Marion, and State of Indiana, have invented a certain new and useful Process for Treating Potatoes; and I do hereby declare that the following is a full, clear, and exact description thereof.

My invention has for its object the preparation of potatoes to make a product for the market that, among other things, has two prominent characteristics—viz., ease of preservation and quickness in the preparation of the article for the table. The article is exempt from decomposition in any weather or climate and is prepared for the table within about three minutes. The article possessing these characteristics still contains all the original elements of nutrition, with the advantage also of presenting such nutritious portions freed from all impurities. The article is desiccated, and an important advantage resulting from this treatment of potatoes is the reduction in weight, which means a great saving in freight and ultimate cost.

Another very important advantage of my invention is in the effect of such treatment upon what are called "watery" potatoes, that are, as prepared by most people, unfit for food, and therefore a loss. Such potatoes when treated by my process make as valuable a food product as potatoes in the best condition. The step in my process that contributes largely to this effect is the extraction of some of the moisture from the potato before cooking by pressure or otherwise, whereby mealiness of the product, which is evidence of a good potato, is obtained.

The most important steps of my process consist in chemically disintegrating the vegetable tissues of the tubers, quickly cooking the product, reducing the latter when cool to small particles, and then desiccating the same.

One means of disintegrating the vegetable tissues is by subjecting the potato to the action of sulfur dioxid or its compounds, which also effects other changes hereinafter mentioned. I also preferably extract the moisture by compression previous to cooking and subject the compressed material to a hot-water bath. There are other important features in my invention in addition to the foregoing, all of which will more fully appear from the following description and claims.

While a valuable product can be made by the process set forth in the broad statement of my invention above, I shall here describe the details of the process which I have found preferable and which makes the best product.

In detail, the raw potatoes are pared and sliced, preferably into four pieces. They are then washed in cold water. The starch that settles from this cutting and washing of the potatoes may be gathered as a by-product; but this forms no part of my invention. The potatoes are then placed in cold water which contains a small quantity of sulfur dioxid in the form of sulfite or bisulfite of lime or any other suitable form. A practicable proportion is ten grains of the chemical to a gallon of water. The potatoes are soaked in this solution from one to six hours. The chief purpose of subjecting the potato in this manner to the action of sulfur dioxid or its compounds is to effect a disintegration of the vegetable tissues that form so considerable a part of the potato, such as cellulose. This also neutralizes the salts, separates all slimy and fatty matters, and dissolves the albuminoids. The sulfurous gas further penetrates the potato and until entirely spent it helps to effect a speedier solution of the starch in the final product. A similar effect may also be brought about more or less completely by fermentation, which step in the process, however, is preferable after the cooking; but the method above set forth is the better. After soaking the potatoes are repeatedly washed in fresh water, whereby the impurities and non-nutritious elements are removed. Then some of the moisture is extracted from the potatoes. This is preferably done by slightly pressing the same between cloth, the cloth taking up the surplus moisture. It may, however, be done by partly evaporating the moisture in a centrifugal extractor or by any other means, so that on the average the potatoes lose about twenty per cent. of their moisture and retain only as much water as is necessary in the cooking, but not sufficient to transform the starch granules not in direct contact with the boiling water into a paste. I preferably then plunge the potatoes into hot water or subject them to a stem-bath for the purpose of instantly producing a pasty starch coating around the outside, which keeps the water or steam in which the potatoes are then boiled from penetrating the same. It is preferable that this coat shall be produced quickly, and for that purpose boiling water is preferred, although a scalding temperature will suffice. The potatoes are then cooked either by steaming or boiling. I preferably cook the potatoes by boiling them with a small quantity of soda or other alkaline substances in an open vessel, with repeated changes of water. The purpose of putting soda or other alkaline substances in the water is to remove any atoms of sulfurous gas that may still remain suspended in the potato. The soda or other alkaline substances by their neutralizing power counteract or prevent the formation of sulfuric acid. The repeated change of the water is for the same purpose and for further purifying the article. I stop the boiling promptly when the potatoes are fairly cooked for the purpose of preserving largely the individuality of the small particles of starch and to prevent the product from being converted into a pasty mass. The product of the foregoing steps of my process is then cooled and when cold is mashed. Mashing the potatoes when cold is an important feature in my process, as it keeps the potatoes not only mealier, but of brighter color than if they were mashed hot. If the potatoes were mashed hot, the steam developed during the mashing would penetrate the starch granules and cause them to lose their individuality, and the product when dried would be sticky and have the grayish tint of fully-dissolved and afterward dried starch. It is preferable, but not necessary, after cold mashing to subject the product to an hour's fermentation. By this I mean to let the product stand for about an hour, during which slight fermentation is taking place. This fermentation may be hastened by a slight addition of vinous and lactic ferment. It acts on the cooked potato somewhat as the sulfur dioxid does on the raw ones, at least it facilitates the dissolution of the ultimate product. After this the product is reduced to small pieces or particles—say into vermicular or granular form. The product is then desiccated, which is the last step in the process. This is preferably done by baking in a closed vessel or oven and then desiccating the product in an open container. Any means of desiccation will be tolerably satisfactory.

The product resulting from the foregoing-described process is of a bright yellow color. This distinguishes it from the product that would result from a process where the granules of starch were thoroughly dissolved, for in such case the product would have a steel-gray color or tint. The latter product also would not be mealy and would be sticky if moist, very hard if dry, and more or less non-soluble when moistened, and in these particulars it is quite the opposite of my product.

I might also add that if potatoes were treated without cooking the same they would, when dissolved, be dark-colored, of a biting taste, and either paste-like or lumpy, according to the more or less accomplished assimilation of the starchy and fibrous matters, and would never be mealy.

The product of my process when dissolved in hot water to prepare it for the table not only has the appearance, the sweetness, the flavor, and consistence of a freshly-cooked mealy potato, but is superior because of the elimination of the impurities and the fact that it can be easily preserved and quickly prepared.

What I claim as my invention, and desire to secure by Letters Patent, is—

1. The process of preparing and preserving potatoes which consists in chemically disintegrating the vegetable tissues of the tubers, forming a pasty coat on the exterior and cooking the product, then cooling the same, reducing it to particles or small pieces, and finally desiccating it, substantially as set forth.

2. The process of preparing and preserving potatoes which consists in disintegrating the vegetable tissues of the tubers in the manner specified, forming a thin pasty coat on the exterior and cooking the product, next cooling the same, reducing it to particles or small pieces, and desiccating the latter, substantially as set forth.

3. The improved process of preparing and preserving potatoes, consisting in disintegrating the vegetable tissue of the tubers by treatment with a suitable compound of sulfur dioxid, producing a thin pasty coat on the exterior and cooking the product, allowing the same to cool, then reducing it to a vermicular or equivalent form, and desiccating it by baking, substantially as set forth.

4. The improved process of preparing potatoes which consists in disintegrating the vegetable tissues by soaking in a solution of sulfur dioxid, subjecting the product to a steam-bath, to form a pasty coat thereon, cooking in an alkaline bath, mashing the product when cool, and desiccating it by baking, substantially as set forth.

In witness whereof I have hereunto affixed my signature in the presence of the witnesses herein named.

JOHN G. NEUMANN.

Witnesses:
KATHARINE DUNLAP,
GUS C. MEYER.